United States Patent
Bechtel et al.

(10) Patent No.: US 6,863,306 B2
(45) Date of Patent: Mar. 8, 2005

(54) COLLAPSING STEERING COLUMN WITH LOCKING TILT MECHANISM

(75) Inventors: Travis D Bechtel, Goodrich, MI (US); Ronald Klanke, Royal Oak, MI (US); William A Jolley, Waterford, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 10/290,833

(22) Filed: Nov. 8, 2002

(65) Prior Publication Data

US 2004/0090057 A1 May 13, 2004

(51) Int. Cl.[7] .............................................. B62D 1/18
(52) U.S. Cl. ...................... 280/775; 280/777; 280/779; 74/493
(58) Field of Search .............................. 280/775, 777, 280/779; 74/492, 493

(56) References Cited

U.S. PATENT DOCUMENTS

| | | | | |
|---|---|---|---|---|
| 4,098,141 A | * | 7/1978 | Yamaguchi .................. | 74/492 |
| 5,356,179 A | * | 10/1994 | Hildebrandt et al. ........ | 280/777 |
| 5,417,452 A | * | 5/1995 | Khalifa et al. .............. | 280/777 |
| 5,452,916 A | * | 9/1995 | Beecher et al. ............. | 280/777 |
| 5,470,107 A | * | 11/1995 | Muntener et al. ........... | 280/777 |
| 5,497,675 A | * | 3/1996 | Brown et al. ................. | 74/492 |
| 5,593,183 A | * | 1/1997 | Fouquet et al. ............. | 280/775 |
| 5,704,641 A | * | 1/1998 | Shimizu et al. ............. | 280/775 |
| 5,755,461 A | | 5/1998 | Halacka et al. | |
| 5,823,062 A | | 10/1998 | Snell et al. | |
| 5,829,310 A | | 11/1998 | DePaolis | |
| 6,047,987 A | | 4/2000 | Cart | |
| 6,167,777 B1 | | 1/2001 | Snell | |
| 6,241,284 B1 | * | 6/2001 | De Verdier et al. ......... | 280/777 |
| 6,264,239 B1 | | 7/2001 | Link | |
| 6,378,903 B1 | * | 4/2002 | Yabutsuka et al. .......... | 280/777 |
| 6,382,670 B2 | * | 5/2002 | Badaire et al. ............. | 280/777 |
| 6,592,148 B2 | * | 7/2003 | Byers et al. ................. | 280/777 |
| 6,595,079 B2 | * | 7/2003 | Duffy .......................... | 74/492 |
| 6,655,716 B2 | * | 12/2003 | Riefe .......................... | 280/777 |
| 6,685,225 B2 | * | 2/2004 | Hancock et al. ............ | 280/777 |

* cited by examiner

Primary Examiner—Paul N. Dickson
Assistant Examiner—Toan To
(74) Attorney, Agent, or Firm—Ralph E. Smith

(57) ABSTRACT

The present invention is a steering column for a motor vehicle. The steering column comprises a guide bracket, a pivot bracket movably attached to the guide bracket, and a tilt cartridge attached to the pivot bracket. A steering shaft is pivotably attached to the pivot bracket and pivotably attached to the tilt cartridge.

8 Claims, 2 Drawing Sheets

COLLAPSING STEERING COLUMN WITH LOCKING TILT MECHANISM

TECHNICAL FIELD OF THE INVENTION

This invention relates generally to steering columns for motor vehicles, and relates more particularly to a collapsing steering column.

BACKGROUND OF THE INVENTION

A steering column is usually attached to the frame of a motor vehicle at an angle to horizontal. A tiltable steering column allows an operator of the motor vehicle to adjust the height and angle of the steering wheel to the steering column depending on the operator's stature, seat position, and comfort. Typically, the steering wheel can also be placed in an uppermost position to allow the operator to get in and out of the driver's seat more easily. When a frontal force is applied to the steering column, it may be desirable to allow the column to collapse along a certain path regardless of the angle at which the steering wheel is adjusted.

SUMMARY OF THE INVENTION

The present invention is a steering column for a motor vehicle. The steering column comprises a guide bracket, a pivot bracket movably attached to the guide bracket, and a tilt cartridge attached to the pivot bracket. A steering shaft is pivotably attached to the pivot bracket and pivotably attached to the tilt cartridge.

Accordingly, it is an object of the present invention to provide a steering column of the type described above that is tiltable.

Another object of the present invention is to provide a steering column of the type described above that is collapsible along a certain path regardless of the angle at which the steering wheel is adjusted.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
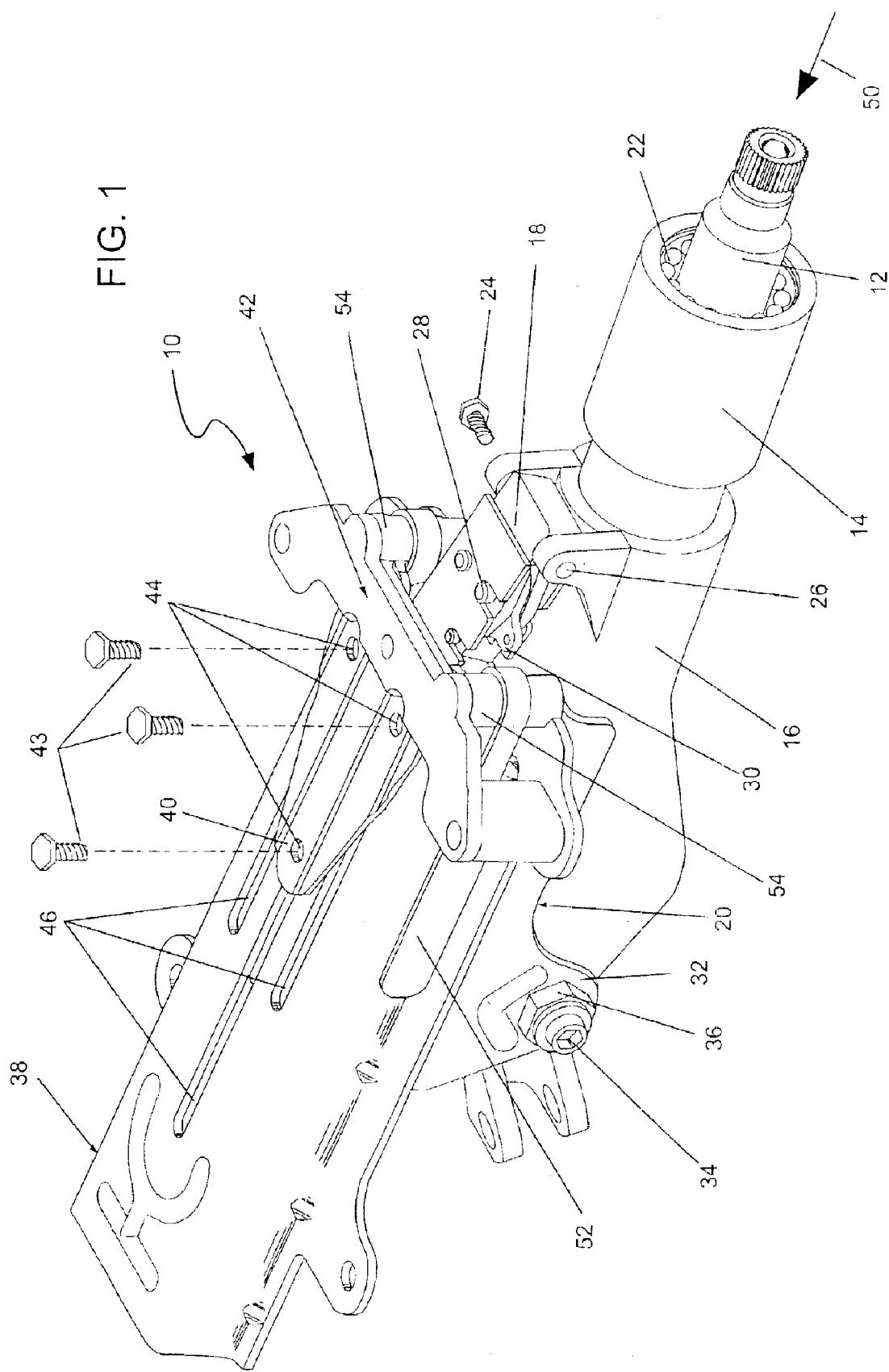
FIG. 1 is a perspective view of a steering column according to the present invention.

FIG. 1 shows one embodiment 10 of a steering column assembly according to the present invention for a motor vehicle. The steering column assembly 10 includes a steering column shaft 12 mounted in a bearing housing 14 and in a steering column housing 16. The steering column housing 16 in turn is secured to a tilt cartridge 18 and to a pivot bracket 20. The steering column shaft 12 is adapted to accept a steering wheel (not shown) on its distal end, as is conventional. The bearing housing 14 contains bearings 22 which allow the rotation of the steering shaft 12.

The tilt cartridge 18 is a manually changeable length position member connected to the steering column housing 16 by one or more bolts 24 that extend laterally through holes 26. The tilt cartridge 18 is adapted to change length as an operator of the motor vehicle adjusts the height and angle of the steering column shaft 12. The tilt cartridge 18 also provides a rigid locking mechanism 28 to secure the steering column shaft at a desired position, and a cam release mechanism 30 that allows angular movement of the steering column shaft 12. Further details of the tilt cartridge 18 are provided in commonly owned U.S. patent application Ser. No. 10/290,726 filed on Nov. 8, 2002, published on May 13, 2004 as Publication No. 2004/0089091 A1 and entitled Cam Lock Tilt Cartridge, the disclosure of which is hereby incorporated by reference.

The steering column housing 16 extends between depending arms 32 of the pivot bracket 20, and is pivotably connected to the arms 32 by bolts 34 and nuts 36. The pivot bracket 20 is also movably mounted to a structural guide bracket 38, which is rigidly secured to a frame of the motor vehicle and may have a varying initial installation angle. A guide plate 40 extends from a mount 42 attached to a structural guide bracket 38, and overlies the structural guide bracket. Fasteners such as bolts 43 extend through holes 44 in the guide plate 40, and through guide slots 46 formed in the structural guide bracket 38, into the pivot bracket 20. The guide slots 46 in the structural guide bracket 38 allow the pivot bracket 20 guided vertical and lateral translation during installation and during an impact event.

Any force impacting the steering wheel in the direction of arrow 50 is transmitted from the steering wheel to the steering shaft 12, and then to the steering column housing 16. The steering column housing in turn transmits the force to the tilt cartridge 18 and to the pivot bracket 20. If the impact force is great enough to overcome a preload provided by the initial tightening of the bolts 43, then the bolts slide into forward areas of the guide slots 46 that are preferably thinned and/or widened in order to reduce or eliminate any frictional force between the bolts and the structural guide bracket 38. The pivot bracket 20 is thereby released from the frictional hold of the bolts 43, and is allowed guided lateral and vertical movement along the guide slots 46 of the structural guide bracket 38. There is thus no need for shear capsules. A steel energy absorption strap 52 is anchored at its opposite distal ends to the pivot bracket 20, and extends generally along the structural guide bracket 38, around posts 54 of the mount 42, and around the tilt cartridge 18 in a generally W shape. The energy absorbing straps 52 absorb the impact energy as the pivot bracket 20 translates along the guide slots 46. Upon lateral and vertical translation due to the applied force, the tilt cartridge 18, the steering column shaft 12, and the guide bracket 38 maintain their geometry, while moving within the plane defined by the structural guide bracket 38 and the guide slots 46.

Figure 2:
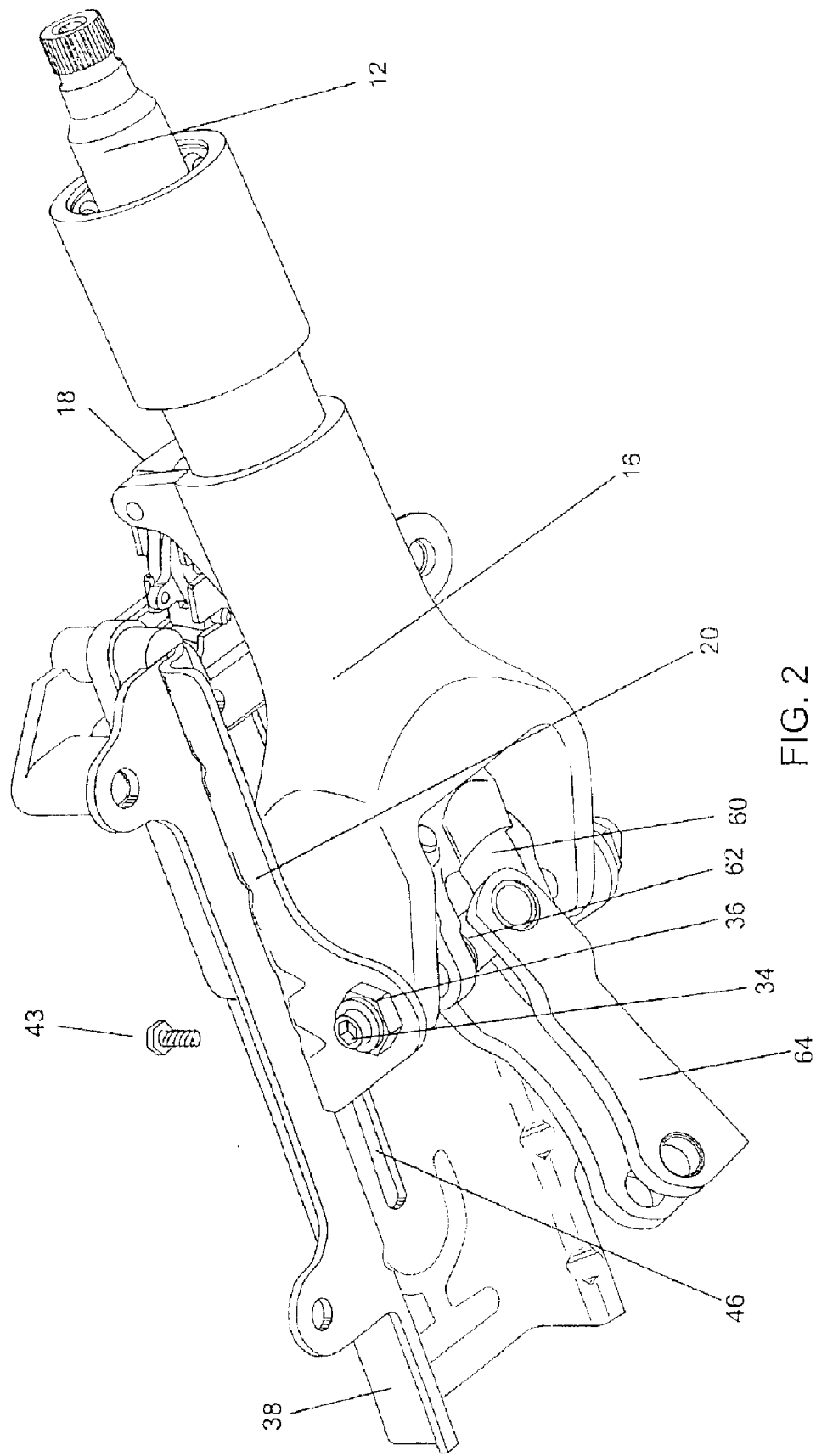
FIG. 2 is another perspective view of the steering column.

FIG. 2 shows the steering column housing 16 attached to the translating pivot bracket 20 by the bolt 34 and the nut 36. A yoke 60 connects the steering column shaft 12 to a joint 62, and an intermediate shaft attachment 64 connects the steering column shaft 12 to a steering gear (not shown) at the joint 62. As the operator adjusts the tilt angle of the steering wheel, the steering shaft 12 pivots around the bolt 34. The steering column shaft 12 is thus vertically adjustable about a transverse axis perpendicular to the longitudinal centerline of the vehicle and of the steering column, to a position desired by the driver. This position is limited, however, to a range within which the steering column extends at an angle generally upwardly and rearwardly.

The collapse load at which the translating pivot bracket 20 breaks the frictional hold of the bolts 43 and strokes along the guide slots 46 preferably does not vary significantly through the allowable adjustment angle of the column shaft, which the tilt cartridge 18 limits between about plus or minus five degrees for driver adjustment. Similarly, the collapse load in the axial direction of the shaft preferably does not vary significantly within about 5 degrees of the installation angle of the structural guide bracket 38.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A steering column for a motor vehicle, the steering column comprising;
    a guide bracket;
    a pivot bracket movably attached to the guide bracket;
    a guide plate attached to the guide bracket;
    a tilt cartridge attached to the pivot bracket; and
    a steering shaft pivotably attached to the pivot bracket and pivotably attached to the tilt cartridge; wherein the guide bracket includes at least one slot, and a fastener extends through the guide plate and the at least one slot to attach the guide plate and the guide bracket to the pivot bracket.

2. The steering column of claim 1 wherein the fastener moves in the at least one slot as the pivot bracket and the guide plate move relative to the guide bracket.

3. The steering column at claim 1 further comprising a mount connected to the guide bracket.

4. The steering column of claim 3 further comprising at least one energy absorption strap engaged with the mount.

5. A collapsible steering column for a motor vehicle, the collapsible steering column comprising:
    a guide bracket;
    a pivot bracket movably attached to the guide bracket;
    a guide plate attached to the guide bracket;
    a tilt cartridge attached to the pivot bracket; and
    a steering shaft pivotably attached to the pivot bracket and pivotably attached to the tilt cartridge; wherein the guide bracket includes at least one slot, and a fastener extends through the guide plate and the at least one slot to attach the guide plate and the guide bracket to the pivot bracket.

6. The steering column of claim 5 wherein the fastener moves in the at least one slot as the pivot bracket and the guide plate move relative to the guide bracket.

7. The steering column of claim 5 further comprising a mount connected to the guide bracket.

8. The steering column of claim 7 further comprising at least one energy absorption strap engaged with the mount.

* * * * *